United States Patent
Webb et al.

[15] 3,655,029
[45] Apr. 11, 1972

[54] CONVEYOR APPARATUS

[72] Inventors: Joseph H. Webb, 26957 Russell Road; Donald G. Stiles, 29682 West Oakland Road, both of Bay Village, Ohio 44140

[22] Filed: May 5, 1969

[21] Appl. No.: 821,884

[52] U.S. Cl. ........................................................198/127 R
[51] Int. Cl. .................................................................B65g 13/02
[58] Field of Search..................................................198/127

[56] References Cited

UNITED STATES PATENTS

| | | | |
|---|---|---|---|
| 795,166 | 7/1905 | Piez | 198/137 |
| 1,967,747 | 7/1934 | Eggleston | 198/127 |
| 2,253,198 | 8/1941 | Regan | 198/127 |
| 2,827,153 | 3/1958 | Olk et al. | 198/127 |
| 3,176,828 | 4/1965 | Sullivan | 198/127 |

Primary Examiner—Richard E. Aegerter
Assistant Examiner—Douglas D. Watts
Attorney—Teare, Teare & Sammon

[57] ABSTRACT

A conveyor apparatus including a frame and a row of spaced, rotatable members mounted on the frame. A drive mechanism including a flexible, endless drive element mounted on the frame for driving the rotatable members. The drive element includes a plurality of alternately spaced protuberance-like actuating portions disposed for coacting driving engagement with selective of the rotatable members, and at least one abutment mechanism including a lengthwise extending abutment member mounted on the frame for urging the actuating portions of the drive element into pressure driving engagement with selective of the rotatable members upon actuation of the drive mechanism.

13 Claims, 3 Drawing Figures

PATENTED APR 11 1972 3,655,029
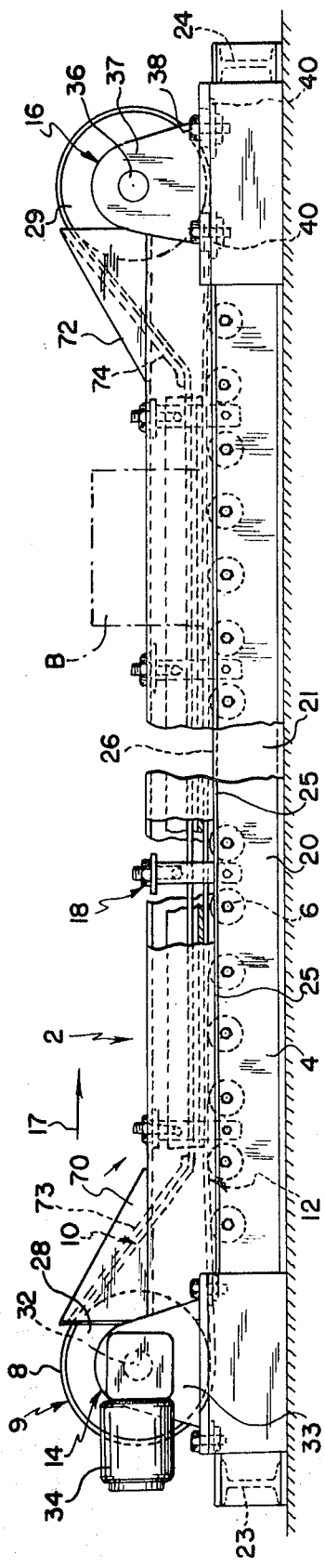
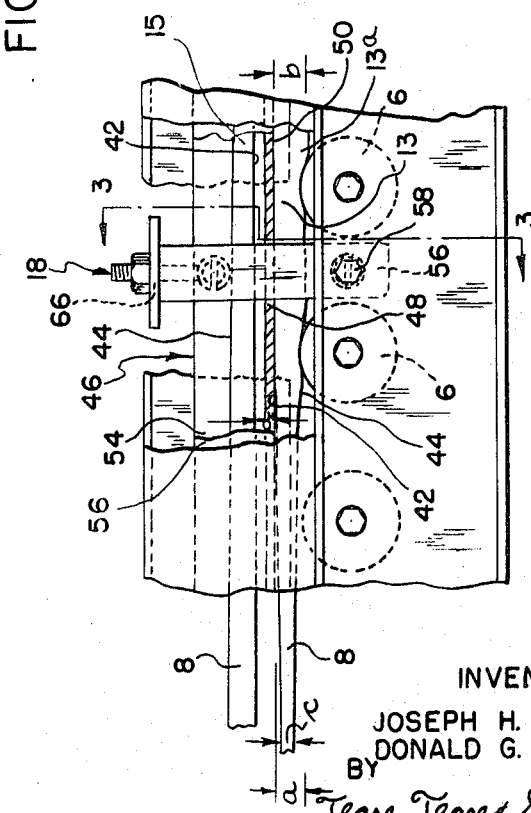
INVENTORS
JOSEPH H. WEBB
DONALD G. STILES
BY
Teare, Teare & Sammon
ATTORNEYS 3,655,029

CONVEYOR APPARATUS

BACKGROUND OF THE INVENTION

The present invention relates to conveyors, and more particularly relates to conveyor apparatus of the general accumulating, live roll type wherein intermittent movement is imparted to articles conveyed thereon.

Heretofore, in conveying apparatus of the accumulating, live roll type there has been provided a plurality of superposed rows of roller members for the conveyance of articles on one of such rows. In such arrangements, the roller members were heretofore driven by a drive belt which was driven in lengthwise relation between a pair of such superposed rows of roller members. However, such heretofore known types of conveyor arrangements were not entirely satisfactory for a number of reasons. Such construction was not only considerably expensive to produce, but was extremely space consuming and bulky and required appreciable maintenance during normal usage thereof. In addition, such multiple roller arrangements were extremely difficult and cumbersome to assemble and disassemble requiring appreciable expense, time and effort. Furthermore, such multiple roller arrangements provided little latitude in the adjustments to the rollers with respect to the drive element and, therefore, reduced the necessary pressure control on the drive element with respect to the roller members, thereby reducing the overall operating efficiency of the conveyance system.

SUMMARY OF THE INVENTION

The present invention contemplates the provision of an improved conveyor apparatus of the accumulating, live roll type for applying selective intermittent movement to one or more articles to be conveyed thereon. The conveyor apparatus includes a frame and a conveyance means including a row of laterally spaced, rotatable members mounted for free rotation on said frame. A drive mechanism including a flexible, endless drive element is operably associated with said frame for imparting selective rotational movement to said rotatable members. The drive element comprises a plurality of successive and alternately spaced protuberance-like actuating portions disposed for overlying driving coacting engagement with selective of said rotatable members. At least one abutment mechanism is resiliently mounted on said frame and includes an abutment member for sequentially urging the actuating portions of said drive element into coacting friction, pressure driving engagement with selective of said rotatable members so that sequential and intermittent flow-like movement is imparted to articles conveyed on said rotatable members upon actuation of said drive mechanism.

BRIEF DESCRIPTION OF THE DRAWINGS

FIG. 1 is a broken, side elevation view of the conveyor apparatus of the invention, partly in section, and illustrating (broken lines) an article to be conveyed thereon;

FIG. 2 is an enlarged fragmentary side elevation view of a portion of the conveyor apparatus removed from the assembly of FIG. 1, and showing partly in section and partly broken away, a portion of the drive element and one of the abutment mechanisms of the present invention; and FIG. 3 is a fragmentary vertical section view taken along the line 3—3 of FIG. 2.

DESCRIPTION OF THE PREFERRED EMBODIMENTS

In general, the conveyor apparatus of the present invention, designated generally at 2 of FIG. 1, is illustrated for use in transporting articles B, such as boxes or the like, in a lengthwise direction thereof. The conveyor apparatus 2 includes a frame 4 and a plurality of roller members 6 which extend transversely of and which are journaled for rotation on the frame 4 so as to support the articles B in rolling engagement thereon. A drive mechanism 9 is mounted on the frame 4 and includes a flexible, endless drive element 8 having an upper reach portion 10 and a lower reach portion 12. The drive element 8 includes a plurality of protuberance-like actuating portions 13 (FIG. 2) disposed in successive and alternately spaced relation lengthwise of the drive element. In the form shown, the drive element 8 may be supported in driving relation at one end by a drive unit, as at 14, and at its other end by a follower unit, as at 16, for driving the element 8, such as in a clockwise direction indicated by the arrow 17, generally lengthwise with respect to the frame 4. A plurality of laterally spaced abutment mechanisms 18 are carried by the frame 4 and are adapted to engage the drive element 8 in pressure applying relation adjacent the respective actuating portions 13 thereof so as to urge the actuating portions 13 into driving engagement with a selective number of adjacent of the roller members 6. By this arrangement, upon actuation of the drive mechanism 9 there is imparted a sequential driving movement to a given number of the roller members 6, thereby to intermittently convey one or more of the articles B in a lengthwise direction with respect to the conveyor frame 4.

In the form shown, the frame 4 is of a generally elongated, flat construction including a pair of spaced, oppositely disposed channel members 20 and 21 which extend in generally parallel relation with respect to one another. To this end, the channel members 20 and 21 may be supported adjacent their opposed ends by cross-members 23 and 24, such as I-beams or the like, which may be suitably affixed thereto, such as by weldments or the like.

As best shown in FIGS. 1 and 2, the roller members 6 preferably comprise elongated, cylindrical rollers which extend transversely between the channel members 20 and 21 and which have their opposed distal ends journaled for rotation in such channel members. Preferably, the roller members 6 are mounted adjacent the upper ends of the channel members 20 and 21 so that they are enabled to project above the upper flanges 25 and 26 of the respective channel members. By this arrangement, as the articles B are caused to move along the upper supporting surface presented by the roller members 6, they will not be obstructed or interfered with by the channel members 20 and 21. Preferably, the roller members 6 are disposed in laterally spaced relation with respect to one another so that their confronting surfaces will not be in engagement to enable the members to freely rotate between the channel members 20 and 21 upon driving engagement of the drive element 8. It is to be understood, however, that the diameter and/or spacing between the roller members 6 will vary depending upon the size, number and/or shape of the articles to be conveyed.

In the embodiment shown, the drive mechanism 9 includes the flexible, endless drive element 8 which is in the form of a loop-like construction, such as a belt or the like, which is trained, in tensioned relation, at one end around a drive sheave 28 and at the other end around a follower sheave 29. The drive sheave 28 may be mounted on a drive shaft 32 which may be journaled for rotation in a support bearing 33 mounted on the frame 4. The drive sheave 28 may be driven by a suitable power unit 34, such as a geared electric motor or the like. Similarly, the follower sheave 29 may be mounted on another shaft 36 which is journaled for rotation in a support bearing 37 mounted adjacent the opposite end of the frame 4. The support bearing 37 for the follower sheave 29 may be axially adjustable with respect to the frame 4. To this end, the support bearing 37 may be movably attached to the frame by suitable fasteners 38, such as bolts or the like. Elongated slots 40 (only one shown) may be provided in the frame 4 to receive the respective fasteners 38 enabling the bearing support 37 and hence, the follower sheave 29 to be adjusted with respect to the drive sheave 28 so as to maintain the proper tension on the drive element 8, as desired.

In accordance with the invention, the drive element 8 has a non-uniform thickness in transverse cross section including a plurality of successive and alternately spaced protuberance-like actuating portions 13, and with each of the portions 13 having substantially the same width and thickness. More specifically, the actuating portions 13 are of a generally planar-convex construction with the outer convex surfaces 13a disposed for driving engagement with the confronting upper surfaces of the respective roller members 6. Moreover, the actuating portions 13 are interconnected by a generally planar-concave portion 15 of reduced cross sectional thickness. Accordingly, the adjacent portions 13 and 15 smoothly merge in alternating relation with respect to one another providing a smooth undulating exterior along the outer side 44 while the inner side 42 of the upper 10 and lower 12 reach portions extend generally parallel to one another throughout the length of the drive element 8. Preferably, the actuating portions 13 have generally twice the transverse thickness as compared to the reduced portions 15. In the invention, the drive element 8 may be made of any suitable flexible high strength material, such as an elastomeric material, fabric, or any combination thereof. Furthermore, it will be seen in FIG. 3 that the drive element 8 has a substantially reduced transverse width as compared to the corresponding dimension of the respective roller members 6 so as to be disposed in driving engagement adjacent along only one end of the respective roller members 6. For example, when the roller member 6 has a length of about 18½ inches, the drive element 8 has a width of about 2 inches.

In accordance with the invention, the abutment means or mechanism 18 comprises an elongated channel member 46 which extends lengthwise along the frame 4 and which is disposed in generally parallel and outwardly spaced relation with respect to the general plane defined by the confronting upper surfaces of the respective roller member 6. As best seen in FIG. 2, the channel member 46 is preferably of a generally U-shaped construction in transverse cross section and includes a central web portion 48 which is preferably disposed in overlying relation with respect to the lower reach portion 12 of the drive element 8. Preferably, the web portion 48 includes a substantially flat, smooth lower surface 50 which is adapted for slide action engagement by the confronting inner surface 42 of the drive element 8 as the latter is moved lengthwise by respective of the roller member 6. The channel member 46 further includes a pair of spaced, integral upstanding flanges 52 and 54 (FIG. 3) which extend upwardly from the web portion 48. The web portion 48 together with the respective flanges 52 and 54 form a lengthwise extending trough 56 which is adapted to receive the upper reach portion of the drive element therein. In the form shown, the channel member 46 may be supported on the frame 4 by means of a plurality of laterally spaced, bracket-like support members 57 which are mounted on the frame 4. As best seen in FIG. 2, the bracket members 57 are each preferably of an identical construction having a generally inverted U-shaped configuration and have an outer arm portion 55 which may be connected to the frame 4 by suitable fasteners 58, such as bolts or the like. Each of the bracket members 57 preferably includes a generally flat bight portion 59 which projects inwardly of the conveyor in overlying relation with respect to the channel member 46 and a free or inner arm portion 61 which projects downwardly with respect to the bight portion 59 along the opposite or inner side of the channel member 46.

In the invention, the channel member 46 is preferably suspended in hanging relation from the bracket member 57 by means of a hanger member 60 (FIG. 3) which is of a generally inverted T-shaped configuration and which includes a cross member 62 which may be connected at its opposed ends to the flanges 52 and 54 of the channel member 46, such as by weldments or the like. A generally centrally disposed support arm 64 is provided having one end attached to the cross member 62, such as by weldments or the like, and with its opposite end preferably extending upwardly from the cross member 62, and which is preferably adapted for detachable connection to the bight portion 59 of the respective bracket member 57. Preferably, the bight portion 59 of the bracket member 57 is provided with an opening 66 which is adapted to receive the support arm 64 in loosely slidable relation therein. Preferably, the opposite end of the support arm 64 is threaded, as at 67, so as to receive a suitable locking element 68, such as a nut or the like, which may be disposed to overlie the marginal edge 69 of the opening 66, thereby to abuttingly engage the bight portion 59 for supporting the hanger member 60 therefrom. By this arrangement, the channel member is disposed in a generally floating pressure applying relation, such as by its own weight under gravity, for coacting abutment with the confronting upper generally flat inner side 42 of the drive element 8 for urging the opposite convex side 44 into driving engagement with the confronting upper surface of a respective one of the roller members 6. Accordingly, the channel member 46 is supported in suspended relation via the hanger member 60 and the adjustment elements 67 and 68 for free floating movement toward and away from the lower reach portion 12 of the drive element 8 dependent upon the adjustment of the locking element 68. Furthermore, the respective bracket members 57 and hence, the channel member 46 is resiliently mounted on the frame 4 so as to accommodate in sliding relation the successive and alternately disposed thickened 13 and reduced width portions 15 which define the actuating construction of the drive element 8. It is to be understood that though four of the bracket members 57 have been illustrated (FIG. 1) in conjunction with the pressure applying channel member 46, it is to be understood that any number and/or arrangement of such bracket members may be employed for resiliently urging the lower reach portion 12 of the drive element 8 into coacting driving engagement with the confronting upper surfaces of selective of the respective roller members 6, as desired.

In accordance with the invention, rotative movement is imparted to selective of the roller members 6 by the action of the confronting lower surface 50 of the channel member 46 which is adapted to engage the inner side 42 of the lower reach portion 12 so as to resiliently urge the actuating portions 13 of the drive element into driving engagement with the roller members. For this purpose, the transverse distance, such as ($a$) between the confronting lower surface 50 of the web portion 48 (FIGS. 2 and 3) and the respective roller members 6 is preferably less than the maximum transverse width, such as ($b$), of the actuating portion 13 of the drive element 8, but is preferably greater than the minimum transverse thickness, such as ($c$), of the drive element 8. By this arrangement, only certain selective ones of adjacent roller members, such as 6a and 6b, will be drivingly engaged by the actuating portion 13 of the drive element 8 which will be driven in the same direction as the direction of movement of the drive element 8 upon actuation of the drive sheave 28.

To provide maximum driving torque for the roller members 6 while maintaining low silhouette construction, it is preferred that the upper reach portion 10 of the drive element 8 be disposed interiorly of the trough 56 of the channel member 46. To this end, it is preferred that the diameter of the respective drive and follower sheaves 28 and 29 be greater than the transverse distance ($d$) between the upper 10 and lower 12 reach portions of the drive element 8.

In the invention, it is preferred that the lower reach portion 12 extend generally linearly between the drive 28 and follower 29 sheaves, as best seen in FIG. 1. Accordingly, it is preferred that guide members 70 and 72 be provided at the opposed ends of the channel member 46 adjacent the respective sheaves 28 and 29. Preferably, the guide members 70 and 72 are generally of an identical construction and may include flat guide plates 73 and 74 which are adapted for coacting sliding engagement with the confronting surface of the adjacent upper reach portion 10 of the drive element 8. The plates 73 and 74 are inclined downwardly in a direction from the respective sheaves 28 and 29 toward the conveyor frame 4 and preferably have their respective lower ends disposed within the trough 56 of the channel member 46. By this arrangement, the upper or opposed ends of the plates 73 and 74 are disposed generally tangentially with respect to the associated sheaves 28 and 29 to enable the conveyor to operate in either direction, such as clockwise or counter-clockwise.

For example, in the embodiment shown the plates 73 and 74 direct the upper reach portion 10 downwardly adjacent the drive sheave 28 and then upwardly at the follower sheave 29 so that the upper 10 and lower 12 reach portions are disposed generally parallel to one another in the area of the transverse span between the ends of the respective guide members 70 and 72. By this arrangement, there is provided a conveyor apparatus having a single row of laterally spaced roller members in conjunction with a drive arrangement which provides an economical, low silhouette construction. In addition, this arrangement maximizes the driving coacting engagement between the drive element, the drive and follower sheaves 28 and 29 so as to impart maximum torque forces for driving selective of the roller members.

We claim:
1. A conveyor apparatus comprising,
a frame,
a row of spaced, rotatable members mounted on said frame,
a drive means including an endless flexible drive element mounted on said frame for driving said rotatable members,
an abutment mechanism mounted on said frame including an elongated abutment member extending lengthwise of said frame in overlying, spaced relationship with respect to said rotatable members,
said drive element extending lengthwise through the space between said abutment member and said rotatable members
said drive element including a plurality of spaced, protuberance-like actuating portions disposed for coacting engagement with the confronting surface of said rotatable members and said abutment member for substantially simultaneously driving selective of said rotatable members in the same direction with respect to said frame
said drive means includes spaced, rotatable drive and follower members mounted on said frame,
said drive element being trained around said drive and follower members,
said drive element including spaced, inner and outer reach portions extending between said drive and follower members and being disposed outwardly of and on one side of said row of rotatable members,
said inner reach portion being disposed for said driving engagement with said rotatable members.
said abutment member is of a channel-like construction including a web portion and spaced upstanding flanges,
a hanger assembly operably connected to said flanges for suspending said abutment in overlying relation with respect to said inner reach portion,
said outer reach portion extends through the space between said flanges, and
said web portion guidingly supports said outer reach portion in spaced relation from said inner reach portion reducing the load on said drive means and providing a low silhouette construction for said apparatus.

2. A conveyor apparatus in accordance with claim 1, wherein
said abutment member extends in a lengthwise direction between said inner and outer reach portions being adapted for urging said inner reach portion into said driving engagement with said rotatable members.

3. A conveyor apparatus in accordance with claim 1, wherein
said abutment member extends in a lengthwise direction between said outer and inner reach portions,
said drive element includes a generally planar inner surface,
said inner surface of said drive element adjacent said inner and outer reach portions extending substantially co-extensively with one another, and
said abutment member extends substantially coextensively in length with the corresponding inner surfaces of said inner and outer reach portions in the operative condition of said conveyor apparatus.

4. A conveyor apparatus in accordance with claim 1, including guide means disposed inwardly of and adjacent the respective drive and follower members, and
said guide means operably coacting with said outer reach portion for directing the same angularly inwardly adjacent its opposed ends toward said inner reach portion.

5. A conveyor apparatus in accordance with claim 1, including selectively adjustable means operably associated with said drive element for maintaining a predetermined tension on said drive element.

6. A conveyor apparatus in accordance with claim 1, wherein
said abutment member is disposed below said outer reach portion for guiding said outer reach portion in spaced relation above said inner reach portion.

7. A conveyor apparatus comprising,
a frame,
a row of spaced, rotatable members mounted on said frame,
a drive means including an endless flexible drive element mounted on said frame for driving said rotatable members,
an abutment mechanism mounted on said frame including an elongated abutment member extending lengthwise of said frame in overlying, spaced relationship with respect to said rotatable members,
said drive element extending lengthwise through the space between said abutment member and said rotatable members,
said drive element including a plurality of spaced, protuberance-like actuating portions disposed for coacting engagement with the confronting surface of said rotatable members and said abutment member for substantially simultaneously driving selective of said rotatable members in the same direction with respect to said frame,
said drive means includes spaced, rotatable drive and follower members mounted on said frame,
said drive element being trained around said drive and follower members, and
said drive element including spaced, inner and outer reach portions extending between said drive and follower members and being disposed outwardly of and on one side of said row of rotatable members, and
said abutment member extending lengthwise of said drive element between said inner and outer reach portions in overlying relation with respect to said inner reach portion for urging said actuating portions into engagement with said rotatable members for driving said rotatable members and supporting said outer reach portion in spaced relation from said inner reach portion to reduce the load on said drive means and provide a low silhouette construction for said apparatus.

8. A conveyor apparatus in accordance with claim 7, wherein
said abutment mechanism includes a hanger assembly mounted on said frame, and
said abutment member being suspended from said hanger assembly for applying pressure, to said rotatable members.

9. A conveyor apparatus in accordance with claim 7, wherein
said hanger assembly includes selectively adjustable means for supporting said abutment member in lengthwise extending relation on said frame to enable said abutment member to urge said drive element, by gravity, into pressured engagement with selective of said rotatable members.

10. A conveyor apparatus in accordance with claim 7, wherein
said abutment mechanism includes at least one bracket member mounted on said frame, and
said abutment member is supported by said bracket member in the lengthwise direction of said frame in hanging overlying relation with respect to said rotatable members, at least one hanger member suspended from said bracket member and connected to said abutment member for supporting said abutment member in said hanging relation with respect to said rotatable members.

11. A conveyor apparatus in accordance with claim 10, wherein
said bracket member is generally inverted U-shaped in configuration having a bight portion extending inwardly of said frame,
said bight portion including an opening therein, and
said hanger member is generally inverted T-shaped in configuration including an upwardly extending support arm disposed in loosely sliding relation within said opening to enable said abutment member to coactingly engage said drive element in generally floating pressure applying relation.

12. A conveyor apparatus in accordance with claim 7, including
guide means disposed inwardly of and adjacent the respective drive and follower members, and
said guide means operably coacting with said outer reach portion for directing said outer reach portion angularly inwardly adjacent its opposed ends toward said inner reach portion.

13. A conveyor apparatus in accordance with claim 7, wherein
said actuating portions being interconnected by generally planar-concave portions of reduced cross-sectional thickness,
said actuating portions having a minimum transverse thickness greater than the transverse distance between said abutment member and the confronting surface of said rotatable members, and
said planar-concave portions having a maximum thickness less than the minimum transverse distance between said abutment member and the confronting surface of said rotatable members.

* * * * *